United States Patent
Robinson et al.

(10) Patent No.: US 8,423,419 B2
(45) Date of Patent: Apr. 16, 2013

(54) RELATED PARTS IDENTIFICATION AND SALES TOOL

(75) Inventors: Gary A. Robinson, East Peoria, IL (US); David W. Wiggers, Morton, IL (US); Rollin G. Reeb, Metamora, IL (US); Kent A. Gashaw, Groveland, IL (US); Brian J. Wirth, Morton, IL (US); Bobby L. England, Washington, IL (US); Kelly R. Bumgarner, Elmwood, IL (US); Elango G. Joseph, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 997 days.

(21) Appl. No.: 12/078,425

(22) Filed: Mar. 31, 2008

(65) Prior Publication Data

US 2009/0248545 A1 Oct. 1, 2009

(51) Int. Cl.
*G06Q 30/00* (2012.01)

(52) U.S. Cl.
USPC .................... 705/26.1; 705/27.1; 705/305

(58) Field of Classification Search ........... 705/26, 705/27, 26.1, 27.1, 305
See application file for complete search history.

(56) References Cited

U.S. PATENT DOCUMENTS

| | | | |
|---|---|---|---|
| 5,946,521 A | 8/1999 | Budnik et al. | |
| 6,263,322 B1 | 7/2001 | Kirkevold et al. | |
| 6,484,182 B1 * | 11/2002 | Dunphy et al. | 700/231 |
| 6,678,591 B2 | 1/2004 | Ohmura et al. | |
| 6,810,406 B2 | 10/2004 | Schlabach et al. | |
| 6,873,967 B1 | 3/2005 | Kalagnanam et al. | |
| 6,877,033 B1 | 4/2005 | Garrett et al. | |
| 6,959,235 B1 | 10/2005 | Abdel-Malek et al. | |
| 7,209,817 B2 | 4/2007 | Abdel-Malek et al. | |
| 7,434,730 B2 * | 10/2008 | Jain | 235/380 |
| 7,636,676 B1 * | 12/2009 | Wolery et al. | 705/26.4 |
| 7,945,480 B2 * | 5/2011 | Scruton et al. | 705/26.4 |
| 2001/0042030 A1 | 11/2001 | Ito et al. | |
| 2005/0144183 A1 | 6/2005 | McQuown et al. | |

OTHER PUBLICATIONS

Optimization Models in Support of Performance Based Logistics Contracts (Nowicki, David Richard, University of Wisconsin—Madison; ProQuest Dissertations and Theses; May 15, 2008).*

* cited by examiner

*Primary Examiner* — Courtney Stopp
(74) *Attorney, Agent, or Firm* — Finnegan, Henderson, Farabow, Garrett & Dunner LLP (57) ABSTRACT

A method of identifying related parts is disclosed. The method includes receiving a selection of a product, receiving a selection of at least one part of a product, and identifying at least one related part structurally associated with the selected at least one part. The method further includes generating a parts list containing the selected at least one part and the identified at least one related part, and presenting the parts list.

15 Claims, 8 Drawing Sheets

| 302 | 304 | 306 | 308 | 310 | 300 |
|---|---|---|---|---|---|
| PRODUCT SERIAL NO. | PART NO. | PART NAME | GROUP NO. | GROUP NAME | |
| ... | ... | ... | ... | ... | |

FIG. 3

| 402 | 404 | 406 | 408 | 400 |
|---|---|---|---|---|
| PRODUCT SERIAL NO. | PART NO. | ALTERNATIVE PART NAME | STANDARD PART NAME | |
| ... | ... | ... | ... | |

FIG. 4

| 502 | 504 | 506 | 508 | 500 |
|---|---|---|---|---|
| PRODUCT SERIAL NO. | PART NO. | STANDARD PART NAME | PRODUCT STRUCTURE ID | |
| ... | ... | ... | ... | |

FIG. 5

| 602 | 604 | 600 |
|---|---|---|
| PRODUCT STRUCTURE ID | KIT NAME | |
| ... | ... | |

RELATED PARTS IDENTIFICATION AND SALES TOOL

TECHNICAL FIELD

The present disclosure is directed to the field of parts sales and, more particularly, to a related parts identification and sales tool.

BACKGROUND

The diagnosis, maintenance, and repair of complex products, such as vehicles, appliances, industrial equipment, and other complex products can be difficult and time consuming. Expert knowledge and/or expensive diagnostic equipment may be required to ensure that the products can be properly diagnosed, maintained, or repaired.

Various tools have been developed to assist with such tasks. One such tool is described in U.S. Patent Application Publication No. 2005/0144183 by McQuown et al. (the '183 publication). The '183 publication describes a handheld portable unit that can be used by a locomotive technician on-site to access information needed to repair, diagnose, and troubleshoot locomotive problems and undertake necessary repairs. For example, the technician can download schematics, repair manuals, repair recommendations, and other resources to help complete the task at hand. In addition, the technician can use the portable unit to order needed parts from a supplier.

Although the portable unit of the '183 publication may help a technician diagnose, maintain, and repair a locomotive, it may be inadequate. For example, the technician may identify a particular part of the locomotive that needs to be replaced and, thus, order the part using the portable unit. However, the portable unit may not identify other related parts that should be ordered along with the part to ensure the technician can complete the repair. The technician is thus required to have the knowledge and foresight to identify such related parts at the time of the order.

The present disclosure is directed to overcoming one or more of the problems set forth above.

SUMMARY

One aspect of the disclosure is directed to a computer-readable medium having stored thereon computer-readable instructions which, when executed by a computer, cause the computer to perform a method of identifying related parts. The method may include receiving a selection of a product, receiving a selection of at least one part of the product, and identifying at least one related part structurally associated with the selected at least one part. The method may further include generating a parts list containing the selected at least one part and the identified at least one related part, and presenting the parts list.

Another aspect of the disclosure is directed to a method of identifying related parts. The method may include receiving a selection of a product, receiving a selection of at least one part of a product, and identifying at least one related part structurally associated with the selected at least one part. The method may further include generating a parts list containing the selected at least one part and the identified at least one related part, and presenting the parts list.

Yet another aspect of the disclosure is directed to a computer system. The computer system may include a memory, at least one input device, and a processor in communication with the memory and the at least one input device. The processor may receive, via the input device, a selection of a product; receive, via the input device, a selection of at least one part of the product; and identify at least one related part structurally associated with the selected at least one part. The processor may further generate a parts list containing the selected at least one part and the identified at least one related part, and present the parts list.

DETAILED DESCRIPTION

Figure 1:
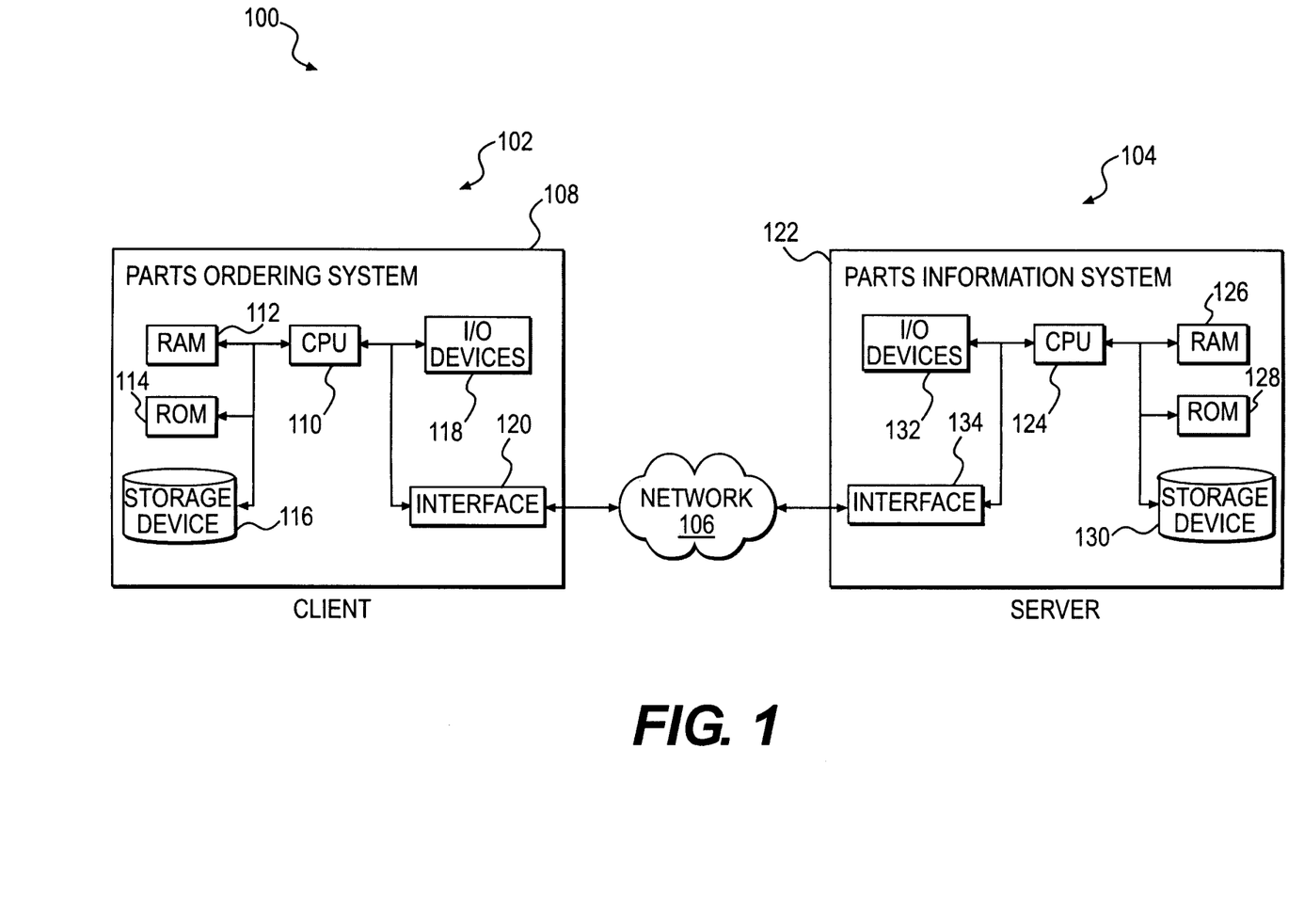
FIG. 1 shows a representation of an exemplary disclosed parts-ordering environment.

FIG. 1 provides a block diagram illustrating an exemplary disclosed parts-ordering environment 100. Parts-ordering environment 100 may include any type of environment for ordering, monitoring, or otherwise managing parts associated with one or more products. For example, parts-ordering environment 100 may include a part warehouse or dealer configured to receive and distribute large numbers of parts for operating a business. As used herein, the term "part" may refer to any component or element of a product. For example, a "product" may be a vehicle including a plurality of parts, such as bolts, rings, seals, gaskets, hoses, wires, pumps, engines, motors, and/or other parts.

Parts-ordering environment 100 may include a client 102 in communication with a server 104 via a network 106 (e.g., the Internet or another packet-switched network, a dedicated intranet, or another suitable network).

Client 102 may represent any entity which may wish to acquire one or more parts for a product. For instance, client 102 may represent a computer terminal at a home or office, a parts store, a dealership, or any other entity associated with parts acquisition. Client 102 may include a parts-ordering system 108 which allows a user thereof to order one or more parts of a product to complete a repair of the product.

Parts-ordering system 108 may be a platform including any type of processor-based system on which processes and methods consistent with the disclosed embodiments may be implemented. Parts-ordering system 108 may include, for example, a desktop computer, a laptop computer, a personal digital assistant (PDA), a hand-held computer (e.g., a Pocket PC), a cellular telephone, or any other computing system known in the art.

As illustrated in FIG. 1, parts-ordering system 108 may include one or more hardware and/or software components configured to execute software programs. For example, parts-ordering system 108 may include one or more hardware components, such as a central processing unit (CPU) 110 in communication with random access memory (RAM) 112, a read-only memory (ROM) 114, a storage device 116, one or more input/output (I/O) devices 118, and an interface 120. Parts-ordering system 108 may include one or more software components such as a computer-readable medium including computer-executable instructions for performing methods consistent with certain disclosed embodiments. One or more of the hardware components listed above may be implemented using software. For example, storage device 116 may include a software partition associated with one or more other hardware components of parts-ordering system 108. Part-ordering system 108 may include additional, fewer, and/or different components than those listed above, as the components listed above are exemplary only and not intended to be limiting.

CPU 110 may include one or more processors configured to execute instructions and to process data to perform one or more functions associated with parts-ordering system 108. As illustrated in FIG. 1, CPU 110 may be communicatively coupled to RAM 112, ROM 114, storage device 116, I/O devices 118, and interface 120. CPU 110 may be configured to execute sequences of computer program instructions to perform various processes, which will be described in detail below. The computer program instructions may be loaded into RAM 112 for execution by CPU 110.

RAM 112 and ROM 114 may each include one or more devices for storing information associated with an operation of parts-ordering system 108 and CPU 110. RAM 112 may include a memory device for storing data associated with one or more operations of CPU 110. For example, RAM 112 may include static RAM (SRAM) and/or dynamic RAM (DRAM). ROM 114 may include erasable programmable read-only memory (EPROM), electrically erasable programmable read-only memory (EEPROM), or any other suitable ROM device.

Instructions from ROM 114 may loaded into RAM 112 for execution by CPU 110. ROM 114 may be configured to access and to store information for identifying, initializing, and monitoring the operation of one or more components and subsystems of parts-ordering system 108.

Storage device 116 may include any type of mass storage device configured to store information that CPU 110 may need to perform processes consistent with the disclosed embodiments. For example, storage device 116 may include one or more magnetic and/or optical disk devices, such as a hard drive, CD-ROM, DVD-ROM, a Flash drive, and/or any other type of mass media storage device.

I/O devices 118 may include one or more components configured to communicate information with a user of parts-ordering system 108. For example, I/O devices 118 may include a console with an integrated keyboard and mouse to allow a user to input parameters associated with parts-ordering system 108. I/O devices 118 may also include a display (e.g., an LCD, a CRT display, or a plasma display), including a graphical user interface (GUI) executed by parts-ordering system 108 for inputting and outputting information. I/O devices 118 may also include peripheral devices such as, for example, a printer for printing information associated with parts-ordering system 108; a user-accessible disk drive (e.g., a USB port, a floppy, CD-ROM, or DVD-ROM drive, etc.) to allow a user to input data stored on a portable media device; a microphone; a speaker; and/or any other suitable type of interface device for inputting and/or outputting information to and/or from a computing system. The results of received data may be provided as output from parts-ordering system 108 via I/O devices 118 for printed display, viewing, and/or further communication to other system devices.

Interface 120 may include one or more components configured to transmit and to receive data through network 106. Interface 120 may include and/or otherwise be associated with appropriate network architecture (not shown) to facilitate such communication. The network architecture may include, alone or in any suitable combination, one or more modulators, demodulators, multiplexers, demultiplexers, antennas, modems, gateways, routers, and/or any other devices configured to enable data communication via network 106, e.g., a telephone-based network (such as PBX or POTS), a local area network (LAN), a wide area network (WAN), a dedicated intranet, a workstation peer-to-peer network, a direct link network, a wireless network, etc.

In a case where client 102 includes a parts store, a dealer, or the like, parts-ordering system 108 may monitor and manage inventory records, including transactions, part and product distribution, and/or other changes in inventory, such as surpluses and deficits uncovered during physical counts. Parts-ordering system 108 may periodically or continuously monitor inventory data and recommended quantities of parts to maintain in inventory. Parts-ordering system 108 may also be configured to receive a parts order from a user and place the order with one or more parts suppliers (not shown) for fulfillment.

Server 104 may represent any entity that maintains parts information about one or more products. For example, in a case where client 102 includes a dealer, a parts store, or the like, server 104 may represent the manufacturer of one or more products maintained by client 102. In other embodiments, server 104 may represent a supplier, a distributor, or any other entity associated with product and/or parts sales, servicing, and/or manufacturing. Although illustrated as a single client 102 and a single server 104, a plurality of clients 102 may be connected to either a single, centralized server 104 or a plurality of distributed servers 104.

Server 104 may include a parts information system 122 configured to provide product and/or parts information to client 102. Parts information system 122 may include any type of processor-based system on which processes and methods consistent with the disclosed embodiments may be implemented. For example, parts information system 122 may be a desktop or laptop computer, one or more designated server computers connected via a network, or any other suitable server computing system owned or otherwise controlled by the entity of server 104.

As shown in FIG. 1, parts information system 122 may include components similar to those discussed above in connection with parts-ordering system 108. Namely, parts information system 122 may include a CPU 124, RAM 126, ROM 128, a storage device 130, I/O devices 132, and/or an interface 134. These components may have structure and/or functionality similar to their counterparts discussed above in connection with parts-ordering system 108.

Figure 2:
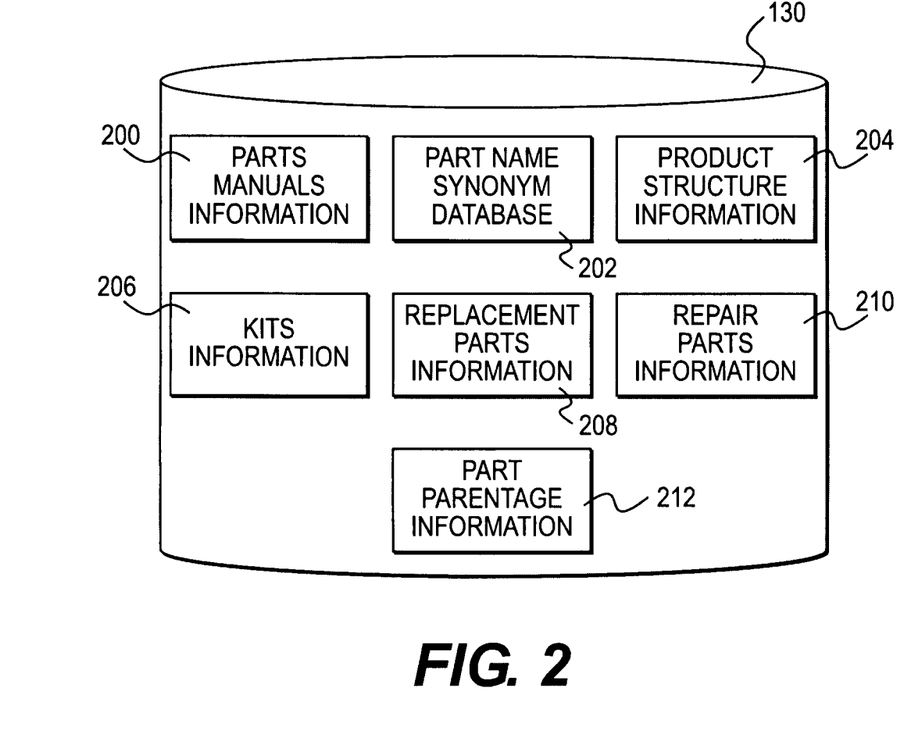
FIG. 2 shows a representation of exemplary information stored in a storage device of the parts-ordering environment of FIG. 1.

FIG. 2 shows a representation of information stored on storage device 130. Storage device 130 may include, among other things, parts manuals information 200, a part name synonym database 202, product structure information 204, kits information 206, replacement parts information 208, repair parts information 210, and part parentage information 212.

Parts manuals information 200 may include information about one or more products supported by the entity in control of server 104. Specifically, parts manual information 200 may include an electronic version of the manufacturer's parts manual for each supported product. For example, referring to FIG. 3, parts manuals information may include one or more parts manual tables 300 for supported products. Parts manual table 300 may include information for identifying all of the parts that make up a product. For example, parts manual table 300 may include fields for product serial number 302, part number 304, part name 306, group number 308, and group name 310, among other things.

Figure 3:
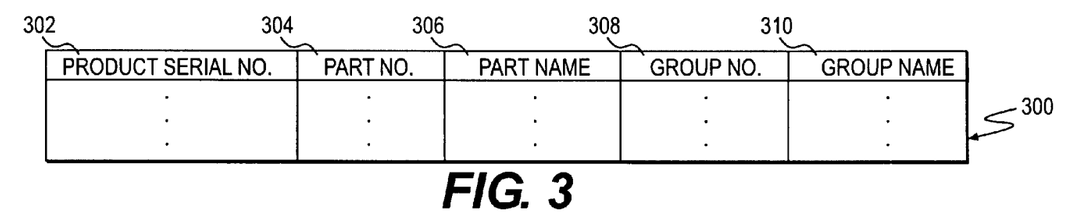
FIGS. 3-9 show exemplary detailed representations of the information stored in the storage device of FIG. 2.

Product serial number field 302 may include string of characters identifying the particular supported products. For example, in a case where the product is a vehicle, excavation machine, or the like, product serial number field 302 may include a vehicle identification number (VIN) or another serial number identifying the manufacturer, product attributes (e.g., a model number), a manufacturing date, a manufacturing location, and/or other relevant product identification information. Part number field 304 may include a string of characters identifying a particular part of the product (e.g., a bolt, a gasket, a valve, an oil cooler, etc.). Part name field 306 may include the name given to the part by the manufacturer. Group number field 308 may include a string of characters identifying interrelated parts that function together for a specific purpose (e.g., hydraulics group, cab electronics group, engine oil filter group, etc.). As such, multiple part numbers in parts manual table 300 may have the same group number. Group name field 310 may include the name given to the group by the manufacturer. Parts manual tables 300 may be leveraged by parts-ordering environment 100 to, among other things, identify parts associated with a particular product.

Part name synonym database 202 may include information for converting one or more alternative part names into a single, standard part name for use by parts-ordering environment 100. Over time, a particular part may come to be known by different names, and it may be useful, for purposes of ordering parts, to identify the part by a standard name to eliminate confusion in the ordering process. For example, a washer may be referred to as a seal, an O-ring, and/or other names.

Figure 4:
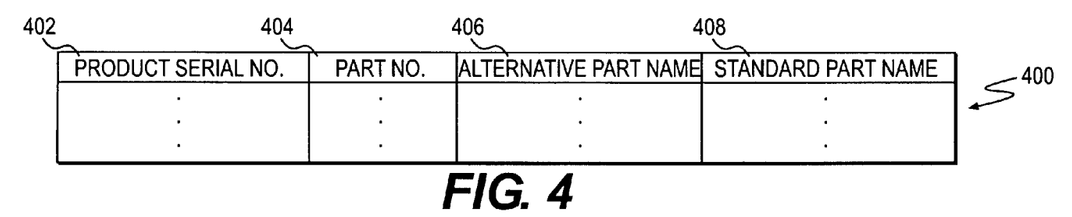

Referring to FIG. 4, part name synonym database 202 may include one or more part name synonym tables 400 for the supported products containing information for identifying standard part names for the parts that make up the products. Part name synonym table 400 may have fields corresponding to product serial number 402, part number 404, alternative part name 406, and standard part name 408.

Product serial number field 402 and part number field 404 may include strings of characters identifying the particular products, and strings of characters identifying particular parts of the products, respectively, as mentioned above. Alternative part name field 406 may contain one or more alternative part names by which each part of the product is known. Standard part name field 408, on the other hand, may contain standard names for the parts of the products to be used by parts-ordering environment 100. As such, a single standard part name and/or part number may correspond to one or more alternative part names.

Product structure information 204 may include information for identifying a group of parts structurally associated with a particular part. For example, a vehicle water pump may be made up of, among other parts, an impeller, a gear, a shaft, a bolt, and a gasket. Product structure information 204 may contain information linking or otherwise associating such parts with one another.

Figure 5:
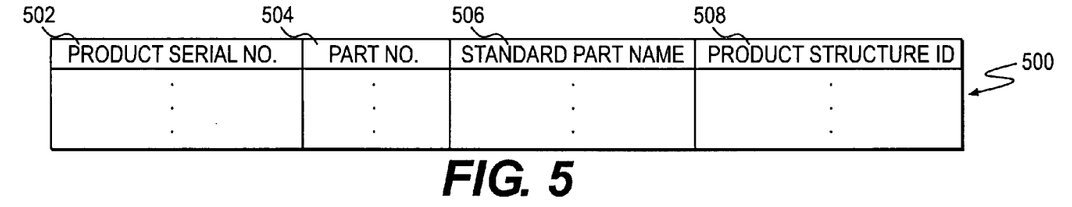

Referring to FIG. 5, for example, product structure information 204 may include one or more product structure tables 500 containing fields for product serial number 502, part number 504, standard part name 506, and product structure identification (PSID) 508.

Product serial number field 502, part number field 504, and standard part name field 506 may include strings of characters identifying the particular products, strings of characters identifying particular parts of the products, and standard part names for the parts for use with parts-ordering environment 100, respectively, as mentioned above. PSID field 508 may contain strings of characters or the like identifying groups of parts structurally associated with one or more parts listed in product structure table 500. That is, a single PSID may correspond to multiple part numbers and standard part names in fields 504 and 506, respectively. In addition, some part assemblies may be used in a variety of different products. For example, a certain water pump may be used in a variety of different vehicles. As such, a given PSID may correspond to one or more products or product serial numbers. Product structure table 500 may be leveraged by parts-ordering environment 100 to, among other things, identify an assembly or group of parts structurally related to one or more selected parts.

Kits information 206 may include information for identifying predetermined kits associated with one or more parts of the supported products. As used herein, "kit" may be any collection of parts, tools, supplies, instructional materials, and/or other such items sold together to service, replace, or recondition a particular part or group of parts.

Figure 6:
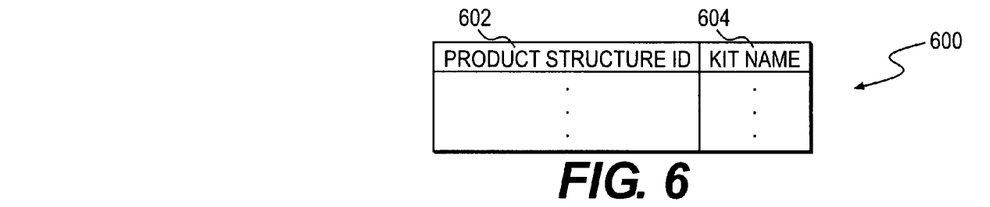

As shown in FIG. 6, for example, kits information 206 may include one or more kits tables 600 containing fields for product structure ID 602, kit name 604, and/or other suitable information for identifying a kit (e.g., a kit number). As mentioned above, product structure ID field 602 may contain strings of characters identifying particular assemblies or groups of structurally related parts (e.g., a water pump, an after cooler, etc.). Kit name field 604 may contain standard names of the kits. Parts-ordering environment 100 may leverage kits tables 600 to identify a kit associated with PSIDs for sale to a customer. It is to be appreciated that a particular kit may correspond to one or more PSIDs. For example, the same kit may be used to install, recondition, or replace both an air conditioner, corresponding to a first PSID, and a heater, corresponding to a second PSID.

Replacement parts information 208 may include information for identifying one or more replacement parts for use with the supported products. By way of a non-limiting example, replacement parts information 208 may include information about filters (e.g., air filters, oil filters, fuel filters, diesel particulate filters), fuses, light bulbs, brake pads, tires, work tools (e.g., a bucket), service tools, accessories, and/or other such items that may be used with, but are not physically part of, the product, and/or "disposable" parts that are periodically replaced.

It is to be appreciated that the information discussed above, i.e., parts manuals information 200, a part name synonym database 202, product structure information 204, kits information 206, replacement parts information 208, repair parts information 210, and part parentage information 212, may be created based on expert knowledge of the supported products (e.g., designated experts on the parts and/or products). This information may be periodically updated manually by an authorized user of parts-ordering system 108 or parts-information system 122, by downloading information from the internet, and/or from other sources.

Figure 7:
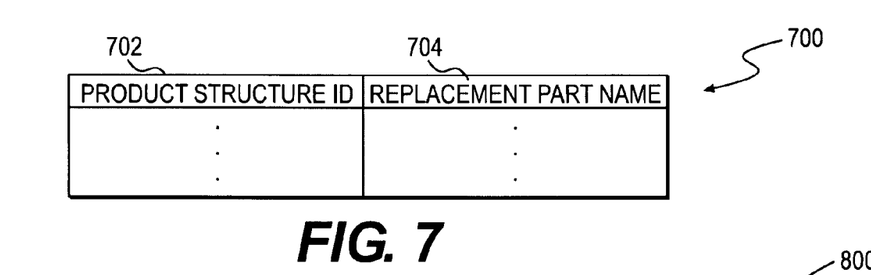

As shown in FIG. 7, for example, replacement parts information 208 may include one or more related replacement parts tables 700 having fields for PSID 702 and replacement part name 704, among other things.

PSID field 702 may contain strings of characters identifying particular assemblies or groups of parts, as mentioned above. Replacement part name 704 may contain standard names of the replacement parts. Parts-ordering environment 100 may leverage related replacement part tables 700 to identify replacement parts associated with PSIDs for sale to a customer. It is to be appreciated that a PSID may correspond to one or more replacement parts. For example, an exhaust system, identified by a corresponding PSID, may require a certain diesel particulate filter and a certain NOx absorber. As such, related replacement parts table 700 may list both the diesel particulate filter and the NOx absorber under this PSID.

Repair parts information 210 may include information for identifying a repair that the customer intends to or should perform, based on a particular part "in hand." In other words, repair parts information 210 may implement repair logic, expert knowledge, or the like, which identifies, based on one or more selected parts being replaced by the customer, the repair that the customer is probably performing (or should perform).

As used herein, "repair" may refer to any maintenance action performed on a product that involves the replacement, recondition, or repair of two or more parts of the product. For example, reconditioning of a vehicle water pump may include the replacement, recondition, or repair of an impeller, a gear, a ball bearing, and a gasket, among other parts. Repair parts information 210 may include information allowing parts-ordering environment 100 to identify, based on the selection of one of these (or other associated) parts, that water pump reconditioning is being performed. Other examples of repairs include engine oil cooler recondition, engine oil filter base recondition, timing belt replacement, etc.

Figure 8:
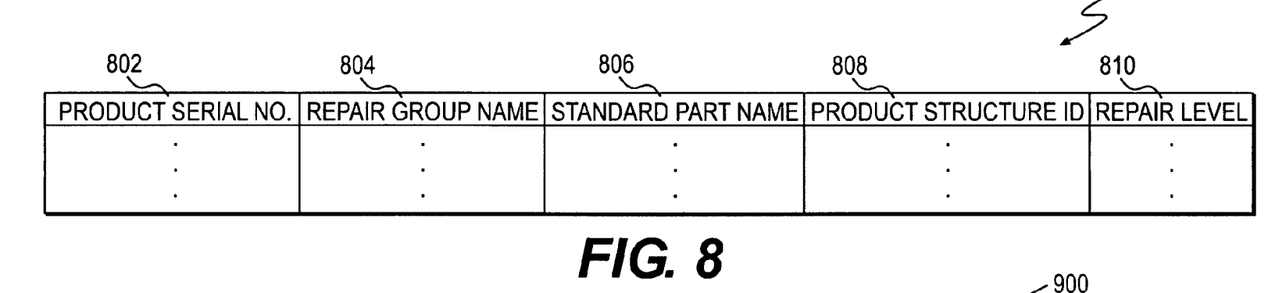

As shown in FIG. 8, for example, repair parts information 210 may include one or more related repair parts tables 800 having fields for product serial number 802, repair group name 804, standard part name 806, PSID 808, and repair level 810.

Product serial number field 802, standard part name field 806, and PSID field 808 may include strings of characters identifying particular products, standard names of the parts for use with parts-ordering environment 100, and strings of characters identifying particular assemblies or groups of structurally related parts, respectively, as discussed above. Repair group name field 804 may contain names of the repairs associated with the corresponding part names in standard part name field 806. For example, the part names of impeller, shaft, and gasket, among others, may correspond to a "water pump recondition" "repair." In another example, a ring, a retainer, a dust cap, and a water cooler may correspond to an "engine oil cooler recondition" repair.

Repair level field 810 may include characters or other identifiers specifying repair levels associated with particular part names. In one embodiment, repair level field 810 may include, associated with each part name in standard part name field 806, a level of "1," "2," or "3." Level "1" may indicate "reusable parts." As used herein, "reusable parts" may include parts that are normally visually inspected and replaced only if they are damaged (e.g., a compressor housing, a turbine housing, or the like). In one embodiment, level "1" parts may be so designated according to reuse and salvage guidelines or other standards known in the art. Level "2" may indicate parts that, if removed, should always be replaced (i.e., 100% replacement parts). In one embodiment, level "2" parts may be those that are likely to be damaged if removed. For example, level "2" may correspond to pins, plates, rings, seals, O-rings, and/or other fastening, sealing, and/or absorbing parts subject to physical stress or wear that, if removed, should be replaced. Level "1" and level "2" parts, together, may include all of the parts required to recondition, repair or restore an entire group or assembly of parts, such as parts within a particular group name, as mentioned above. In contrast, level "3" may correspond to parts that are needed to replace (as opposed to recondition, repair, or restore) a group. For example, parts required to replace the entire hydraulics group or cab electronics group may be specified as level "3" parts.

Parts-ordering environment 100 may leverage related repair parts table 800 to extract, based on one or more selected part names, the particular repair that the customer intends to or should perform. For example, if the customer is replacing (and thus ordering) an impeller, parts-ordering environment 100 may leverage related repair parts table 800 to determine that the customer intends to or should perform a "water pump recondition" repair. Parts-ordering environment 100 may also use repair parts table to determine all other part names associated with the identified repair. Continuing with the example above, if an impeller is selected, parts-ordering environment 100 may thereby determine that the customer intends to or should perform a "water pump recondition" repair and, thus, identify in related repair parts table 800 other parts associated with the water pump recondition (e.g., shaft, gasket, etc.). This will be discussed in further detail below.

Part parentage information 212 may include information for identifying, hierarchically, the location of a given part within the overall product. Some products, such as vehicles and other complex products, include multiple distinct systems, subsystems, arrangements, groups, assemblies, and/or other collections of individual parts. In addition, some of these collections of parts may include one or more of the same parts. For example, a particular seal or gasket may be used in the hydraulics system, the oil cooler system, and/or the air conditioning system. In order to appropriately identify the repair the customer intends to or should perform, it may be necessary to identify with which part, in particular, the customer is concerned. That is, it may be necessary to determine whether the customer is concerned with the seal from the hydraulics group, the oil cooler group, the air conditioning group, or another group. Thus, determining the part's "parent" may help identify which part, in particular, the customer has "in hand."

Figure 9:
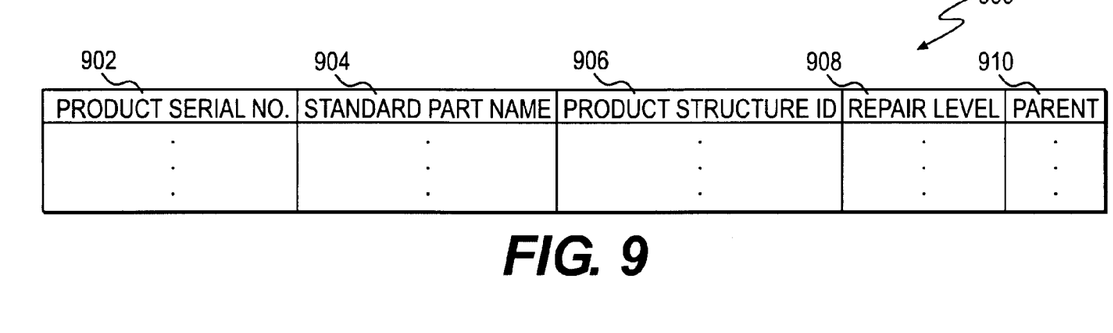

As shown in FIG. 9, for example, part parentage information 212 may include one or more part parentage tables 900 having fields for product serial number 902, standard part name 904, PSID 906, repair level 908, and parent 910.

Product serial number field 902, standard part name field 904, PSID field 906, and repair level field 908 may include strings of characters identifying supported products; strings of characters identifying the standard names of the particular parts of the products for use with parts-ordering environment 100; strings of characters identifying assemblies or groups of structurally-related parts with which the parts are associated; and repair levels associated with the parts; respectively, as discussed above. Parent field 910 may include strings of characters identifying the overall groups in which the particular parts are included. For example, as mentioned above, a particular seal or gasket may be included in the hydraulics group, the oil cooler group, the air conditioning group, or another group.

Parts-ordering environment 100 may leverage parts parentage table 900 to extract from parent field 910 the parent group name associated with the particular part, based on information contained in one or more of the other fields 902-908. In this manner, parts-ordering environment 100 may pinpoint the particular part with which the customer is concerned for purposes of identifying related parts and/or the repair the customer intends to or should perform, which will be discussed in further detail below.

Figure 10:
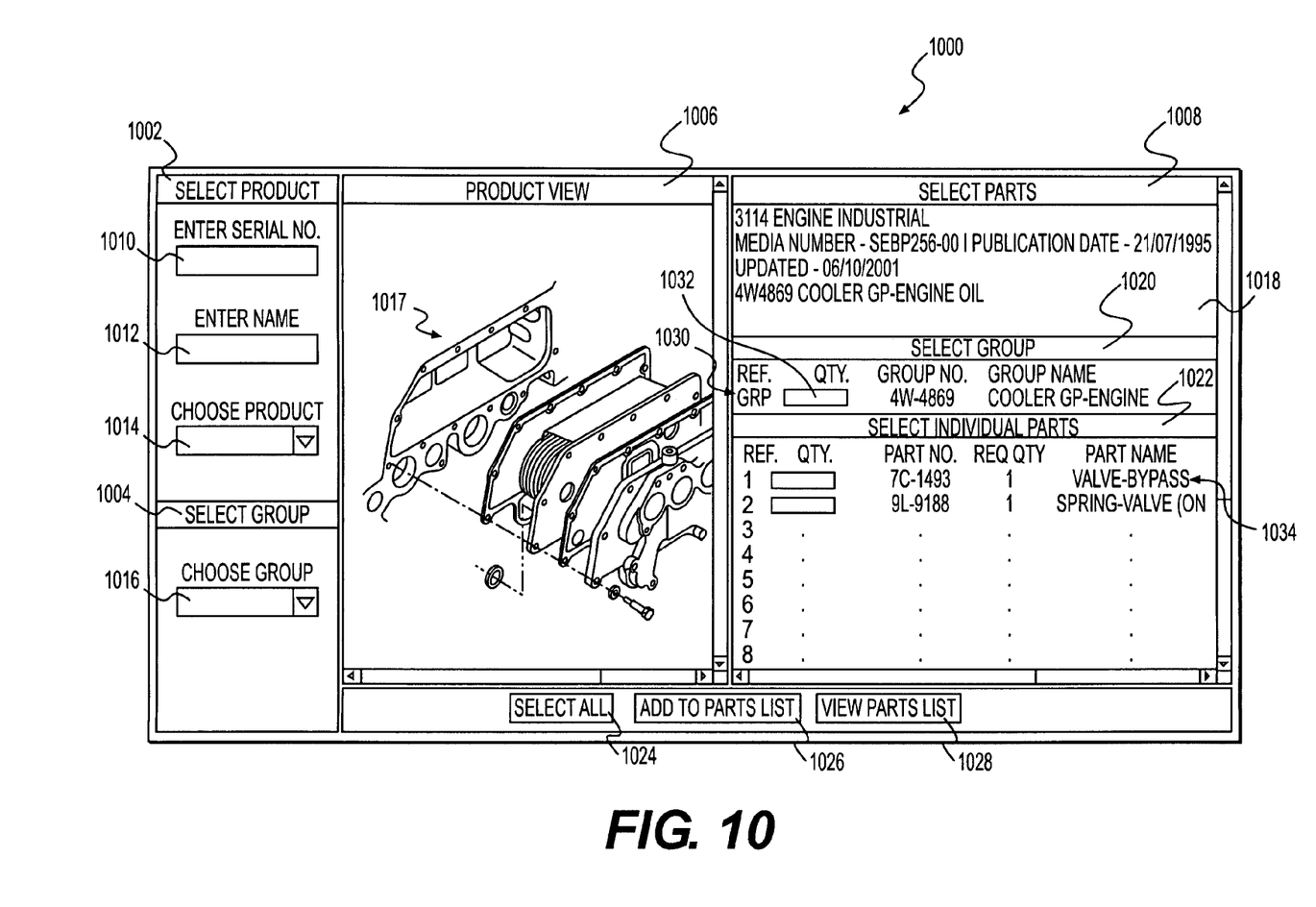
FIG. 10 shows an exemplary graphical user interface application (GUI) executed by the parts-ordering environment of FIG. 1.
Figure 11:
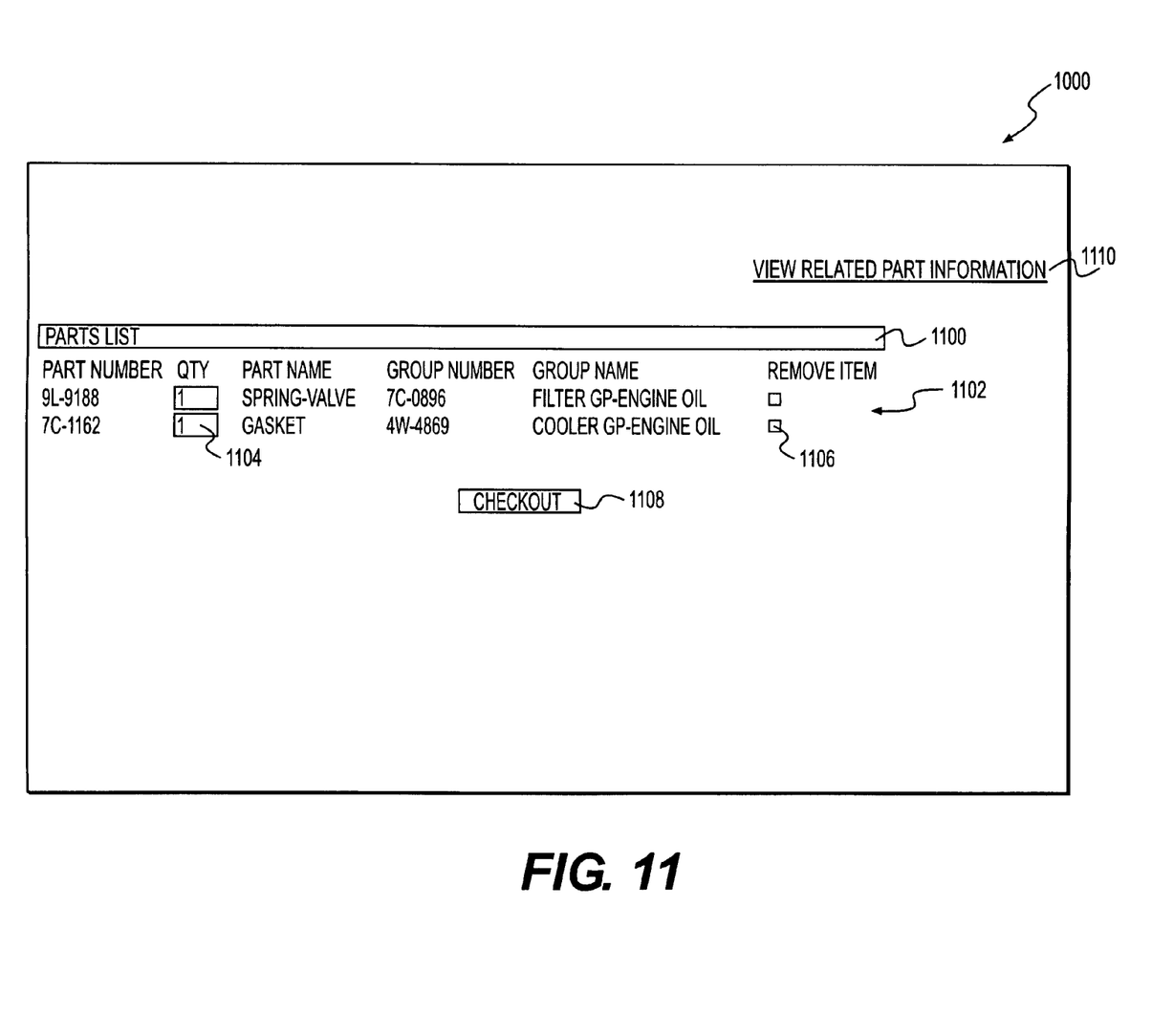
FIG. 11 shows an exemplary parts list provided by the GUI of FIG. 10.

FIGS. 10 and 11 show an exemplary graphical user interface application (GUI) 1000 which may be implemented by parts-ordering environment 100. GUI 1000 may be a software tool run by parts-ordering system 108 and provided to a user of client 102; a software tool run by parts information system 122 (i.e., server 104) and provided to a user of client 102; a webpage application maintained by parts information system (i.e., server 104) and provided to a user of client 102 via network 106; and/or any such application.

Referring to FIG. 10, GUI 1000 may include a select product window 1002, a select group window 1004, a product view window 1006, and a select parts window 1008.

Select product window 1002 may include one or more user interface features for selecting a desired product (e.g., a vehicle) for ordering parts. For example, select product window 1002 may include a product serial number entry field 1010, a product name entry field 1012, and/or a choose product drop-down menu 1014. A user of GUI 1000 may use one or more of these user interface features to select a particular product supported by server 104 for parts-ordering. Upon selection of the product, GUI 1000 may access parts manuals information 200 to retrieve the manufacturer's parts manual for the selected product. In addition, GUI 1000 may update information displayed in select group window 1004, product view window 1006, and/or select parts window 1008 based on the selected product, which will be discussed below.

Select group window 1004 may likewise include one or more user interface features for selecting a desired group of components of the product selected in select product window 1002 (e.g., engine oil cooler group). For example, select group window 1004 may include a choose group drop-down menu 1016. GUI 1000 may automatically list in drop-down menu 1016 each group of the product selected in select product window. Upon selection of a particular group from drop-down menu 1016, GUI 1000 may identify in the parts manual all of the parts corresponding to the selected group. In addition, GUI 1000 may update information shown in product view window 1006 and select parts window 1008 based on the selected group, which will be discussed below.

Product view window 1006 may display a graphical representation 1017 of the product selected in select product window 1002 and/or the group selected in select group window 1004. Specifically, GUI 1000 may retrieve from parts manuals information 200 one or more schematics, images, drawings, and/or other representations of the selected product and/or group (e.g., a .PDF file, a .BMP file, .JPG file, a CAD-based file, etc.). GUI 1000 may then display the representation in product view window 1006, as shown in FIG. 10.

Select parts window 1008 may include a product information display area 1018, a select group feature 1020, and an=select individual parts feature 1022. Select parts window 1008 may also include and/or otherwise be associated with a select all button 1024, an add to parts list button 1026, and a view parts list button 1028.

Product information display area 1018 may display information about the select product and/or group. For instance, product information display area 1018 may display the product name, the product serial number, the selected group name, the selected group number, the publication date and/or version of the parts manual for the selected product, etc.

Select group feature 1020 may present, for the user's selection and subsequent ordering, the group of parts selected in select group window 1004. As shown in FIG. 10, select group feature 1020 may display information about the group 1030, such as the group number and group name, among other things. In addition, select group feature 1020 may include one or more user interface elements, such as a group quantity box 1032, for selection of a desired quantity of the group for ordering. Any group 1030 shown in select group feature 1020 may include each part of the entire group. Thus, if the user wishes to order one of every part in group 1030, the user may enter a "1" in quantity box 1032.

Select individual parts feature 1022 may present, for the user's selection and subsequent ordering, each part 1034 within the group selected in select group window 1004. A user may use select individual parts feature 1022 to select for ordering one or more of the parts 1034 included in group 1030. Like select group feature, select individual parts feature 1022 may display information about parts 1034, such as reference numbers corresponding to the parts 1034 on graphical representation 1017, part numbers, part names, required quantities, and/or other parts information. In addition, select individual parts feature 1022 may include graphical user interface elements, such as part quantity boxes 1036, for selection of a desired number of parts 1034 for ordering. It is to be appreciated that select individual parts feature 1022 may be used for ordering only certain parts, rather than the entire group.

Selection of select all button 1024 may cause GUI 1000 to enter a "1" in each of quantity boxes 1036. Selection of add to parts list button 1026 may cause GUI 1000 to add the respective quantities of groups 1030 and/or parts 1034 entered by the user into quantity boxes 1032 and/or 1036 to parts list 1100 (FIG. 11). Selection of view parts list button 1028 may cause GUI 1000 to display parts list 1100 for the user's review, revision, and ordering.

Referring to FIG. 11, parts list 1100 may indicate parts and/or groups of parts 1102 selected by the user with select group feature 1020 and/or select individual parts feature 1022. Parts list 1100 may be a "checkout basket" or the like indicating items to be ordered by the user. Parts list 1100 may display information about each selected part and/or group 1102, such as part numbers; part names; quantities; and/or other parts information. In addition, parts list 1100 may include user interface elements, such as quantity boxes 1104 and remove item checkboxes 1106 which allow the user to add or remove items from parts list 1100. Parts list 1100 may further include and/or be associated with a checkout button 1108, the selection of which may cause GUI 1000 to place an order for the items in parts list 1100. For example, GUI 1000 may prompt the user to enter billing information and/or shipping information, and place an order for the items with one or more suppliers (now shown).

Figure 12:
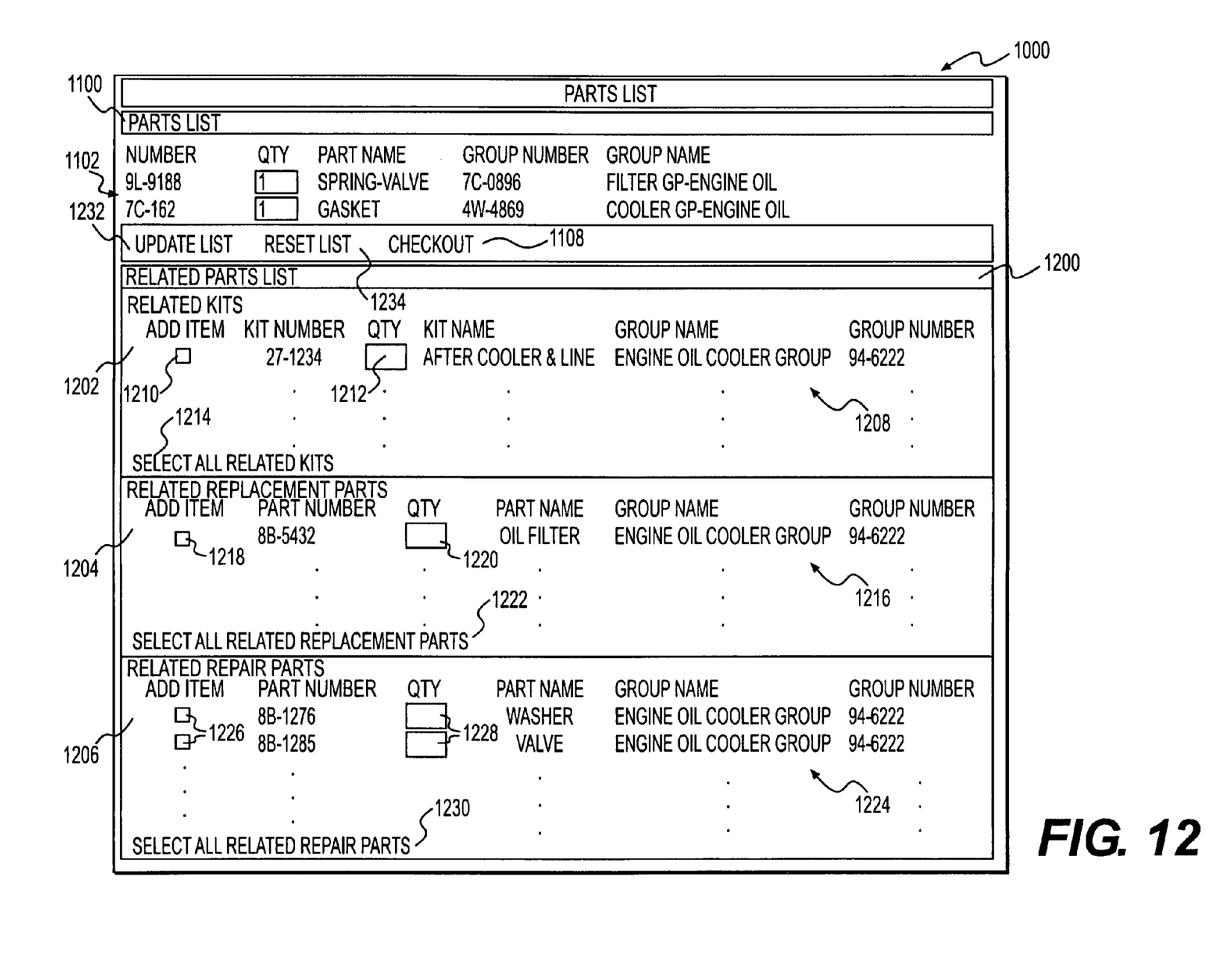
FIG. 12 shows exemplary related parts lists provided by the GUI of FIG. 10.

Parts list 1100 may further include a view related parts information link 1110, which may be displayed when GUI 1000 determines that related parts are available. Selection of view related parts information button may cause GUI 1000 to display, in addition to parts list 1100, a related parts list 1200, as shown in FIG. 12. Determinations as to whether related parts are available will be discussed in further detail below.

Referring to FIG. 12, related parts list may include a related kits display area 1202, a related replacement parts display area 1204, and a related repair parts display area 1206. Selection of view related parts information link 1110 may cause GUI 1000 to display related kits display area 1202, related replacement parts display area 1204, and/or related repair parts display area 1206, if it is determined that such kits, replacement parts, and/or repair parts, respectively, are available.

Related kits display area 1202 may include any kits 1208 determined to be related to one or more of the user's selected parts 1102 in parts list 1100. Related kits display area 1202 may include information about kits 1208, such as kit names, kit numbers, associated group names, an associated group numbers. In addition, related kits display 1202 may include user interface devices, such as add kit checkboxes 1210, kit quantity boxes 1212, and a select all related kits button 1214.

The user may select checkboxes 1210 and enter a value (e.g., "1") into kit quantity boxes 1212 to designate particular related kits (and quantities thereof) for addition to parts list 1100 for ordering. Alternatively, the user may select all related kits button 1214 to designate all of related kits 1208 for addition to parts list 1100 for ordering.

Related replacement parts display area 1204 may include any replacement parts 1216 (e.g., filters, brake pads, etc.) determined to be related to one or more of parts 1102 selected by the user in parts list 1100. Related replacement parts display area 1204 may include information about related replacement parts 1216 such as part names, part numbers, associated group names, and associated group numbers. In addition, related replacement parts display area 1204 may include user interface devices, such as add replacement part checkboxes 1218, replacement part quantity boxes 1220, and a select all related replacement parts button 1222. The user may select checkboxes 1218 and enter a value (e.g., "1") into quantity boxes 1220 to designate particular related kits (and quantities thereof) for addition to parts list 1100 for ordering. Alternatively, the user may select all related replacement parts button 1222 to designate all of related replacement parts 1216 for addition to parts list 1100 for ordering.

Related repair parts display area 1206 may include any repair parts 1224 (e.g., washers, gaskets, seals, shafts, impellers, etc.) determined to be related to one or more of parts 1102 selected by the user in parts list 1100. Related repair parts display area 1206 may include information about related repair parts 1224, such as part names, part numbers, associated group names, and associated group numbers. In addition, related repair parts display area 1206 may include user interface devices, such as add related repair part checkboxes 1226, related repair part quantity boxes 1228, and a select all related repair parts button 1230. The user may select checkboxes 1226 and enter a value (e.g., "1") into quantity boxes 1228 to designate particular related repair parts (and quantities thereof) for addition to parts list 1100 for ordering. Alternatively, the user may select all related repair parts button 1230 to designate all of related repair parts 1224 for addition to parts list 1100 for ordering.

Related parts list 1200 may also include and/or otherwise be associated with an update parts list button 1232 and a reset parts list button 1234. Upon designating all of the desired related kits 1208, related replacement parts 1216, and/or related repair parts 1224 and quantities thereof, as discussed above, the user may select update parts list button 1232 to add these designated items to parts list 1100 for ordering. The user may select reset parts list button 1234 to clear items from parts list 1100.

INDUSTRIAL APPLICABILITY

The disclosed methods and systems may provide a related parts sales tool for products. In particular, the disclosed methods and systems may be used to identify, based on one or more parts selected by a user (i.e., to service, replace, and/or recondition the one or more parts), other related kits, replacement parts, and/or repair parts that should to be brought to the user's attention to ensure that a complete repair can be made. In this manner, both product sales and customer satisfaction may be improved.

Figure 13:
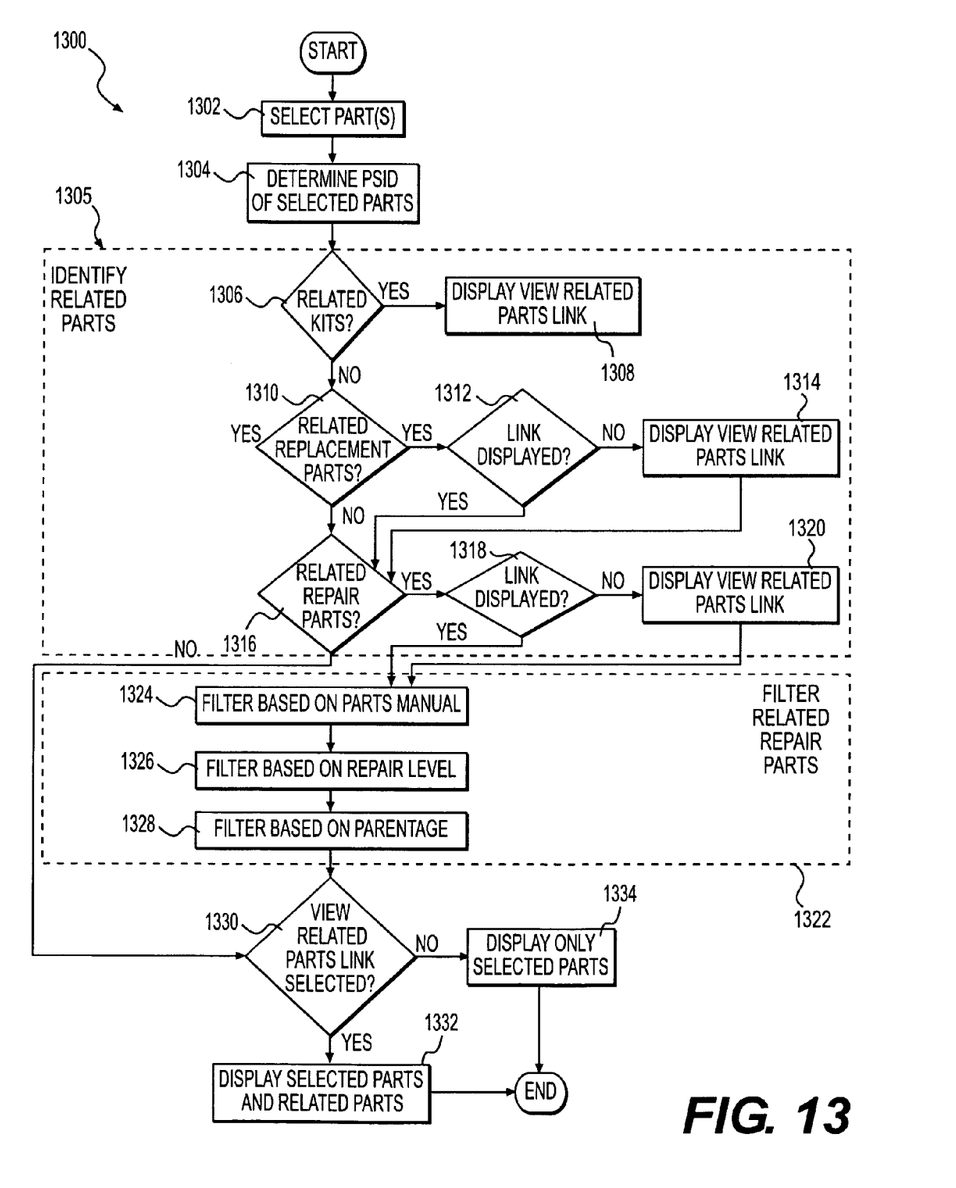
FIG. 13 shows a flowchart depicting exemplary operation of the parts-ordering environment of FIG. 1.

FIG. 13 illustrates exemplary operation 1300 of parts-ordering environment 100. Initially, a user of parts-ordering system 108, such as a customer at home computer or a parts store sales representative on behalf of a customer using an in-store computer, may select one or more parts as discussed above (step 1302).

For example, the user may need to replace the spring valve of the engine oil group and the gasket of the engine oil cooler group in a particular vehicle. As such, the user may select the appropriate product using select product window 1002; the appropriate groups (i.e., the engine oil group and the engine oil cooler group) from select group window 1004; and the spring valve and the gasket from select individual parts feature 1022 as discussed above in connection with FIG. 10. The user may then select add to parts list button 1026.

In step 1302, parts-ordering environment 100 may use the product serial number to access the appropriate product parts manual. Namely, parts-ordering environment 100 may use the product serial number to retrieve from parts manual table 300 part numbers, part names, group numbers, group names, and/or other relevant information about the product, which may be stored in memory for future reference. In addition, parts-ordering environment 100 may convert the part names, as listed in the parts manual (i.e., alternative parts names), into their corresponding standard parts names using part name synonym table 400. In particular, parts-ordering environment 100 may look up the select part names from the parts manual in part name synonym table 400, and identify the corresponding standard part names listed in part name synonym table 400. It is to be appreciated that other methods of identifying standard part names may alternatively or additionally be used.

Parts-ordering environment 100 may then identify the PSIDs associated with the user's select parts (step 1304). Namely, parts-ordering environment 100 may look up in product structure table 500 the standard part names of each of the user's selected parts determined in step 1302 (i.e., the spring valve and the gasket), and extract from product structure table 500 the PSIDs associated with the standard part names. At this point, parts-ordering environment 100 may have identified the groups of parts structurally associated with the user's selected parts (e.g., oil cooler, water pump, etc.), which correspond to these PSIDs.

Parts-ordering environment 100 may next identify any related parts associated with the user's selected parts (steps 1305). This may include determining whether any related kits associated with the user's selected parts are available (step 1306). Specifically, parts-ordering environment 100 may look up in related kits table 600 the PSIDs associated with the user's selected parts identified in step 1304, and extract from related kits table 600 any kit names associated with the PSIDs (e.g., an "oil after cooler and lines" kit). Other information, such as kit numbers, may also be extracted from related kits table 600. This information may be stored in memory for future reference. If one or more related kits are found, parts-ordering environment 100 may display view related parts link 1110 for the user's selection, as shown in FIG. 11 (step 1308).

After displaying view related parts link 1110 in step 1308, or after determining in step 1306 that no related kits are available, parts-ordering environment 100 may identify any related replacement parts associated with the user's selected parts (step 1310). Specifically, parts-ordering environment 100 may look up in related replacement parts table 700 the PSIDs associated with the user's selected parts identified in step 1304, and extract from related replacement parts table 700 any related replacement part names associated with the PSIDs (e.g., an oil filter). Other information, such as part numbers, may also be extracted from related replacement parts table 700. This information may be stored in memory for future reference. If one or more related replacement parts are found, parts-ordering environment 100 may determine whether view related parts link 1110 has already been displayed in step 1308 (step 1312) and, if not, display view related parts link 1110 for the user's selection, as shown in FIG. 11 (step 1314).

After displaying view related parts link 1110 in step 1314, after determining in step 1312 that view related replacement parts link 1110 is already displayed, or after determining in step 1310 that no related replacement parts are available, parts-ordering environment 100 may identify any related repair parts associated with the user's selected parts (step 1316). Specifically, parts-ordering environment 100 may look up in related repair parts table 800 the PSIDs associated with the user's selected parts (i.e., from PSID field 808) identified in step 1302, and extract from related repair parts table 800 any repair group names (i.e., from repair group name field 804) associated with the PSIDs (e.g., engine oil cooler recondition). The repair level (i.e., from repair level field 810) associated with the extracted repair parts may also be retrieved. At this point, parts-ordering environment 100 may have identified the "repair" or repairs that the user intends to or should perform.

During step 1316, parts-ordering environment 100 may identify and extract from related repair parts table 800 any part names associated with the identified repair group names (i.e., from standard part name field 806). Continuing with the example above, parts-ordering environment 100 may identify and extract all parts associated with the "engine oil cooler recondition" repair. At this point, parts-ordering environment 100 may have identified all parts associated with the "engine oil cooler recondition" repair. In some cases, because the same repair could be performed on a variety of different products (e.g., a passenger vehicle, an excavation machine, etc.), parts-ordering environment 100 may have thus identified and extracted parts that are associated with the repair, but that are not part of the user's product. Thus, further processing may be necessary to identify which of these identified parts are associated with both the repair and the user's product, which will be discussed in further detail below. Other information, including part numbers, may also be extracted from related repair parts table 800. This information may be stored in memory for future reference. If one or more related repair parts are found, parts-ordering environment 100 may determine whether view related parts link 1110 has already been displayed in step 1308 or step 1314 (step 1318) and, if not, display view related parts link 1110 for the user's selection, as shown in FIG. 11 (step 1320).

After displaying view related parts link 1110 in step 1320, or after determining in step 1318 that view related replacement parts link 1110 has already been displayed in step 1308 or step 1314, parts-ordering environment 100 may perform filtering on the related repair parts information identified and gathered in step 1316 (steps 1322). The filtering may determine, among other things, which of the related repair parts identified in step 1316 are properly associated with the repair the user intends to or should perform; which of the identified repair parts actually correspond to the particular product with which the user is concerned; which of the identified repair parts fall within the same group or parentage of the user's selected parts; and/or which of the related parts should be brought to the user's attention in order to ensure the user can perform the repair adequately.

For example, the filtering 1322 may include filtering the identified related repair parts information based on the parts manual of the particular product (step 1324). As mentioned above, some related repair parts may be used in one product (e.g., a vehicle), but not another (e.g., an excavation machine) and, thus, some of the related repair parts identified in step 1316 may not be included in the user's particular product. Parts-ordering environment 100 may filter the identified related repair parts by comparing part numbers of the identified repair parts to the part numbers contained in the product parts manual accessed in step 1302. Any identified related repair parts having part numbers not contained in the product parts manual may be discarded.

Parts-ordering environment 100 may further filter the identified related repair parts based upon their associated repair levels (step 1326). In particular, parts-ordering environment 100 may identify the repair levels associated with the user's selected parts. Parts-ordering environment 100 may look up in related repair parts table 800 the user's selected parts and extract the associated repair levels (i.e., from repair level field 810). Parts-ordering environment 100 may then determine, for each repair identified in step 1316 (i.e., each associated repair group name found in repair group name field 804), the highest repair level part of the user's selected parts (with level "1" being higher than level "2," and level "2" being higher than level "3").

Parts-ordering environment 100 may then filter (i.e., remove), for each repair, any identified related repair parts having a repair level higher than the highest repair level of the user's selected parts. For example, the user may have selected a gasket (level "2") and a plug (level "3"), which may be included in the "water pump recondition" repair. Thus, parts-ordering environment 100 may filter the identified related repair parts for the "water pump recondition" repair as to remove all level "1" parts. In another example, the user may have selected an engine oil cooler (level "1") and a ring (level "2"), which may be included in the "engine oil cooler recondition" repair. Thus, parts-ordering environment 100 may remove no identified related parts for the "water pump recondition" repair (as level "1" is the highest level). In a further example, the user may have selected a dust cap (level "3"), which may be included in the "engine oil cooler recondition" repair. Thus, parts-ordering environment 100 may filter the identified related repair parts for the "engine oil cooler recondition" repair as to remove all level "1" and level "2" parts. In other words, level "1" parts may "inherit" or include levels "1," "2," and "3" parts. Likewise, level "2" parts may inherit levels "2" and "3" parts, and level "3" parts may inherit level "3" parts.

It is to be appreciated that the repair level filtering of step 1326 may result in the removal of related parts that are inappropriate given the repair associated with the user's selected parts (i.e., the parts the user has selected and has "in hand" for replacement). For example, if the user has disassembled the product to the extent required to replace a level 3 part (i.e., a relatively minor repair), parts-ordering environment 100 may remove related parts associated with more extensive repairs (i.e., level "1" and level "2" parts). Thus, the repair level filtering of step 1326 may utilize knowledge of the individual products to determine, based on the user's selected parts (i.e., the part or parts the user has "in hand" and wishes to replace), the extent to which the product must have been disassembled to reach the selected parts. In this manner, related repair parts that are inappropriate given the circumstances may be removed, leaving only those related parts that are needed to complete a repair commensurate with the extent to which the product has been disassembled to reach the user's selected parts.

Parts-ordering environment 100 may further filter identified related repair parts based upon part parentage (step 1328). Specifically, parts-ordering environment 100 may identify the parentage of the user's selected parts determined in step 1302 by searching part parentage table 900 for the user's selected parts and extracting the corresponding parents (e.g., group name) of the user's selected parts. Parts-ordering environment 100 may then further filter the identified related repair parts as to remove any parts that do not have the same parent (i.e., group name) as the user's selected parts.

Upon completion of the filtering of steps 1322, or upon determining in step 1316 that no related repair parts are available, parts-ordering environment 100 determine whether the user has selected view related parts link 1110 (step 1330) and, if so, display the user's selected parts 1102 in parts list 1100 as shown in FIG. 12. In addition, parts-ordering environment 100 may display any related kits identified in step 1306 in related kits display area 1202; display any related replacement parts identified in step 1310 in related replacement parts display area 1204; and display any related repair parts identified in step 1316 remaining after filtering steps 1322 in related repair parts display area 1206, as shown in related parts list 1200 of FIG. 12 (step 1332). At this point, the user may be free to select one or more the related parts for ordering (in addition to the user's original selected parts), as discussed above.

If, however, it is determined that the user did not select display related parts link 1110, parts-ordering environment 100 may display only the user's select parts (and not any of the identified related parts) as shown in parts list 1100 of FIG. 11 (step 1334). At this point, the user may be free to order the selected parts, as discussed above.

The disclosed related parts recommendation and sales tool may help ensure that a customer ordering a part for a product may be made aware of other related parts that should be ordered to ensure that the customer is able to complete a repair of the product. In this manner, the customer can order the appropriate parts without being an expert on the product, or even without knowing exactly which parts a particular repair might include. Thus, the frustration of overlooking or forgetting to order a particular part needed for the repair may be reduced or eliminated, thereby improving customer satisfaction and increasing parts sales.

Those skilled in the art will appreciate that all or part of systems and methods consistent with the present disclosure may be stored on or read from other computer-readable media. Parts-ordering environment 100 may include a computer-readable medium having stored thereon machine executable instructions for performing, among other things, the methods disclosed herein. Exemplary computer readable media may include secondary storage devices, like hard disks, floppy disks, and CD-ROM; a carrier wave received from the Internet; or other forms of computer-readable memory, such as read-only memory (ROM) 114 and/or 128 or random-access memory (RAM) 112 and/or 126. Such computer-readable media may be embodied by one or more components of parts-ordering environment 100, such as storage device 116 and/or 130, CPU 110 and/or 124, or combinations of these and other components.

Furthermore, one skilled in the art will also realize that the processes illustrated in this description may be implemented in a variety of ways and include multiple other modules, programs, applications, scripts, processes, threads, or code sections that may all functionally interrelate with each other to accomplish the individual tasks described above for each module, script, and daemon. For example, it is contemplated that these programs modules may be implemented using commercially available software tools, using custom object-oriented code written in the C++ programming language, using applets written in the Java programming language, or may be implemented as with discrete electrical components or as one or more hardwired application specific integrated circuits (ASIC) custom designed for this purpose. In addition, the files, information, data, and tables described herein may be assembled in any format searchable and/or sortable by parts-ordering system 100, such as a spreadsheet (e.g., Excel® or XML files).

The described implementation may include a particular network configuration but embodiments of the present disclosure may be implemented in a variety of data communication network environments using software, hardware, or a combination of hardware and software to provide the processing functions.

It will be apparent to those skilled in the art that various modifications and variations can be made to the disclosed methods for identifying related parts. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A computer-readable medium device having stored thereon computer-readable instructions which, when executed by a computer, cause the computer to perform a method of identifying related parts, the method comprising:
   receiving a selection of a product;
   receiving a selection of at least one part of the product;
   identifying, based on at least one of repair logic or stored expert knowledge, a repair that involves the selected at least one part;
   determining a repair level of the repair that involves the selected at least one part, wherein the repair level includes a first repair level indicating parts required to replace a group of structurally-related parts including the selected at least one part or a second repair level indicating parts required to recondition a group of structurally-related parts including the selected at least one part, and the first repair level is greater than the second repair level;
   identifying at least one additional related part, different from the selected at least one part, that is also involved in the identified repair and that has an associated repair level equal to or below the repair level of the selected at least one part;
   generating a parts list, wherein the parts list includes the selected at least one part and a recommendation of the identified at least one additional related part; and
   presenting the parts list.

2. The computer-readable medium device of claim 1, wherein the method further includes:
   identifying a parts manual for the product;
   determining whether the identified at least one related part is included in the parts manual; and
   removing from the parts list the identified at least one related part when it is determined that the identified at least one related part is not included in the parts manual.

3. The computer-readable medium device of claim 1, wherein the method further includes:
   determining a parentage of the selected at least one part;
   determining a parentage of the identified at least one related part; and
   removing from the parts list the identified at least one related part if the parentage of the identified at least one related part is not the same as the parentage of the selected at least one part.

4. The computer-readable medium device of claim 3, wherein:

the parentage of the selected at least one part includes at least one part hierarchically above the selected at least one part within a structure of the product, and the parentage of the identified at least one related part includes at least one part hierarchically above the identified at least one part within the structure of the product.

5. A computer-implemented method of identifying related parts, the method comprising:

receiving a selection of a product;

receiving a selection of at least one part of the product;

identifying, by at least one processor and based on at least one of repair logic or stored expert knowledge, a repair that involves the selected at least one part;

determining a repair level of the repair that involves the selected at least one part, wherein the repair level includes a first repair level indicating parts required to replace a group of structurally-related parts including the selected at least one part or a second repair level indicating parts required to recondition a group of structurally-related parts including the selected at least one part, and the first repair level is greater than the second repair level;

identifying at least one additional related part, different from the selected at least one part, that is also involved in the identified repair and that has an associated repair level equal to or below the repair level of the selected at least one part;

generating a parts list, wherein the parts list includes the selected at least one part and a recommendation of the identified at least one additional related part; and presenting the parts list.

6. The method of claim 5, further including:

identifying a parts manual for the product;

determining whether the identified at least one related part is included in the parts manual; and removing from the parts list the identified at least one related part when it is determined that the identified at least one related part is not included in the parts manual.

7. The method of claim 5, further including:

determining a parentage of the selected at least one part;

determining a parentage of the identified at least one related part; and removing from the parts list the identified at least one related part if the parentage of the identified at least one related part is not the same as the parentage of the selected at least one part.

8. The method of claim 7, wherein:

the parentage of the selected at least one part includes at least one part hierarchically above the selected at least one part within a structure of the product, and the parentage of the identified at least one related part includes at least one part hierarchically above the identified at least one part within the structure of the product.

9. The method of claim 5, further including ordering, by the user, parts listed in the parts list.

10. A computer system, comprising:

a memory storing at least one of repair logic or expert knowledge;

at least one input device; and a processor in communication with the memory and the at least one input device, wherein the processor:

receives, via the input device, a selection of a product;

receives, via the input device, a selection of at least one part of the product;

identifies, based on the stored at least one of repair logic or expert knowledge, a repair that involves the selected at least one part;

determines a repair level of the repair that involves the selected at least one part, wherein the repair level includes a first repair level indicating parts required to replace a group of structurally-related parts including the selected at least one part or a second repair level indicating parts required to recondition a group of structurally-related parts including the selected at least one part, and the first repair level is greater than the second repair level;

identifies at least one additional related part, different from the selected at least one part, that is also involved in the identified repair and that has an associated repair level equal to or below the repair level of the selected at least one part;

generates a parts list containing the selected at least one part and a recommendation of the identified at least one additional related part; and presents the parts list.

11. The computer system of claim 10, wherein the processor further:

identifies a parts manual for the product;

determines whether the identified at least one related part is included in the parts manual; and removes from the parts list the identified at least one related part when it is determined that the identified at least one related part is not included in the parts manual.

12. The computer system of claim 10, wherein the processor further:

determines a parentage of the selected at least one part;

determines a parentage of the identified at least one related part; and removes from the parts list the identified at least one related part if the parentage of the identified at least one related part is not the same as the parentage of the selected at least one part.

13. The computer system of claim 12, wherein:

the parentage of the selected at least one part includes at least one part hierarchically above the selected at least one part within a structure of the product, and the parentage of the identified at least one related part includes at least one part hierarchically above the identified at least one part within the structure of the product.

14. A computer-implemented method of identifying related parts, the method comprising:

receiving a selection of a product;

receiving a selection of at least one part of the product;

identifying, by at least one processor and based on at least one of repair logic or stored expert knowledge, a repair that involves the selected at least one part;

determining at least one additional related part, different from the selected at least one part, that is also involved in the identified repair;

generating a parts list, wherein the parts list includes the selected at least one part and a recommendation of the identified at least one additional related part;

filtering the parts list, including:

determining a repair level of each of the parts in the parts list, wherein the repair level is determined to be one of: (1) a first repair level designating parts that are visually inspected and replaced only if damaged, (2) a second repair level designating parts, that if removed, are to be replaced, and (3) a third repair level designating parts that are required to replace a collection of parts of the product, wherein the third repair level is greater than the second repair level, and the second repair level is greater than the first repair level; and removing from the parts list any part having a determined repair level that is greater than the determined repair level of the selected at least one part; and presenting the parts list.

15. The method of claim 14, wherein the filtering further includes:

determining a parentage of each of the parts in the parts list, wherein the parentage represents a hierarchical position of the part within a predetermined collection of parts of the product; and removing from the parts list any part having a different parentage than the selected at least one part.

* * * * *